(12) United States Patent
Kang et al.

(10) Patent No.: US 10,979,512 B2
(45) Date of Patent: Apr. 13, 2021

(54) METHOD AND SYSTEM OF DATA PACKET TRANSMISSION

(71) Applicant: WANGSU SCIENCE & TECHNOLOGY CO., LTD., Shanghai (CN)

(72) Inventors: Ruopeng Kang, Shanghai (CN); Zidao Fan, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 119 days.

(21) Appl. No.: 16/329,461

(22) PCT Filed: May 2, 2017

(86) PCT No.: PCT/CN2017/082715
§ 371 (c)(1),
(2) Date: Feb. 28, 2019

(87) PCT Pub. No.: WO2018/192007
PCT Pub. Date: Oct. 25, 2018

(65) Prior Publication Data
US 2019/0260837 A1    Aug. 22, 2019

(30) Foreign Application Priority Data
Apr. 20, 2017   (CN) .......................... 201710261406.9

(51) Int. Cl.
*H04L 29/08*    (2006.01)
*H04L 29/06*    (2006.01)

(52) U.S. Cl.
CPC .......... *H04L 67/146* (2013.01); *H04L 63/101* (2013.01); *H04L 67/02* (2013.01);
(Continued)

(58) Field of Classification Search
CPC .............. H04L 63/101; H04L 63/0263; H04L 63/0281; H04L 63/104; H04L 67/146;
(Continued)

(56) References Cited

U.S. PATENT DOCUMENTS 6,098,172 A      8/2000  Coss et al.
9,513,926 B2 *  12/2016  Snyder, II ............... G06F 7/764
(Continued)

FOREIGN PATENT DOCUMENTS

CN      102438016 A      5/2012
CN      102594877 A      7/2012
(Continued)

OTHER PUBLICATIONS

The China National Intelleectual Property Administration (CNIPA) The China Search Report for 201710261406.9 dated Feb. 2, 2019 20 Pages.
(Continued)

*Primary Examiner* — Todd L Barker
(74) *Attorney, Agent, or Firm* — Anova Law Group, PLLC

(57) ABSTRACT

A data packet transmission method is provided, including: receiving, by a proxy program, a request data packet via a listening port of the proxy program, and after marking the request data packet, sending out, by the proxy program, the marked request data packet; receiving, by a local system, a plurality of request data packets sent by an application program or the proxy program, and matching, by the local system, a mark in the request data packet. When the matching is successful, the request data packet is forwarded out directly, and when the matching is unsuccessful, the request data packet is re-directed to the listening port. Further, a data packet transmission system is provided.

11 Claims, 2 Drawing Sheets

(52) U.S. Cl.
CPC .......... *H04L 67/28* (2013.01); *H04L 67/2804* (2013.01); *H04L 67/2819* (2013.01)

(58) Field of Classification Search
CPC ..... H04L 67/02; H04L 67/28; H04L 67/2804; H04L 67/2819
See application file for complete search history.

(56) References Cited

U.S. PATENT DOCUMENTS

| | | | | |
|---|---|---|---|---|
| 9,948,608 | B2* | 4/2018 | He | H04L 63/08 |
| 2009/0109849 | A1* | 4/2009 | Wood | H04L 47/10 370/235 |
| 2013/0246627 | A1* | 9/2013 | Taylor | H04L 63/104 709/227 |
| 2014/0068104 | A1 | 3/2014 | Armstrong et al. | |
| 2015/0256639 | A1 | 9/2015 | Chow et al. | |
| 2015/0334037 | A1* | 11/2015 | Han | H04L 47/22 370/230 |
| 2020/0059536 | A1* | 2/2020 | Shribman | H04L 63/029 |

FOREIGN PATENT DOCUMENTS

| | | |
|---|---|---|
| CN | 105245464 A | 1/2016 |
| CN | 105791315 A | 7/2016 |
| CN | 106130997 A | 11/2016 |

OTHER PUBLICATIONS

The European Patent Office (EPO) The Extended European Search Report for 17906278.1 dated Oct. 4, 2019 8 Pages.
Antonino Famulari et al, Network-Independent Support for Using Multiple IP Interfaces in Applications, Network and Information Systems Security(SAR-SSI), IEEE, May 18, 2011, pp. 1-10.
The World Intellectual Property Organization (WIPO) International Search Reort for PCT/CN2017/082715 dated Jan. 19, 2018 5 Pages.

* cited by examiner

METHOD AND SYSTEM OF DATA PACKET TRANSMISSION

CROSS-REFERENCES TO RELATED APPLICATIONS

This application is a national phase entry under 35 U.S.C § 371 of International Application No. PCT/CN2017/082715, filed on May 2, 2017, which claims priority to Chinese Patent Application No. 201710261406.9, filed on Apr. 20, 2017, the entire content of all of which are incorporated herein by reference.

FIELD OF THE DISCLOSURE

The present disclosure relates to the field of network technology and, more particularly, relates to a data packet transmission method and system thereof.

BACKGROUND

As the internet technology advances continuously, various kinds of application programs emerge intensively like bamboo shoots after a spring rain. To provide better user experience, network acceleration services directed towards the application programs are developed and provided correspondingly. Given Android application proxy acceleration as an example, the proxy acceleration may be divided into two modes: active proxy and passive proxy. In the active proxy, when the application program starts a network request, the proxy acceleration is actively performed. The passive proxy is also called local proxy, and is an acceleration service program that intercepts a particular request data packet to the local by certain approaches in the system level. Further, after the local proxy program performs corresponding acceleration control, the data packet is re-sent out.

In existing passive proxies, by adding redirection rules, the application data packet is re-directed to the proxy program. However, in certain practical applications, the to-be-accelerated application and the data packet sent after being processed by the proxy program may not be extinguished merely depend on the redirection rules. Further, the data packet sent by the proxy program may be once again re-directed to the proxy program, resulting in the endless loop of the data packet in the system.

BRIEF SUMMARY OF THE DISCLOSURE

To solve issues in existing technologies, embodiments of the present disclosure provide a data packet transmission method and system thereof. The technical solutions are as follows.

On one hand, a data packet transmission method is provided, the method comprises:

receiving, by a proxy program, a request data packet via a listening port, and after marking the request data packet, sending out, by the proxy program, the marked request data packet;

receiving, by a local system, request data packets sent by the proxy program or an application program, and matching, by the local system, a mark in each request data packet. If matching is successful, the request data packet is forwarded directly, and if matching is unsuccessful, the request data packet is re-directed to the listening port of the proxy program.

Further, while configuring the mark for the request data packet, the proxy program adds a mask to the mark.

Further, a value range of the mask is 0x8000000~0xfff00000.

Further, a version of the local system is Android 5.0 or above.

Further, before the proxy program sends out the marked request data packet, the proxy program determines whether the request data packet needs to be accelerated. If the request data packet needs to be accelerated, a destination port and a destination IP address of the request data packet are changed to an acceleration server.

Further, a method of determining whether the request data packet needs to be accelerated comprises: performing white list validation. If the validation is successful, the request data packet needs to be accelerated. If the validation is unsuccessful, whether the request data packet is a data packet of an HTTP request is determined, and when the request data packet is a data packet of the HTTP request, whether acceleration is needed is determined based on a URL and a preset rule.

Further, the proxy program and the application program run on the local system.

Further, a kernel of the local system is a Linux kernel.

On the other hand, a data packet transmission system is provided. The system includes a terminal device, an acceleration server, and a source site. Application programs and proxy programs run on the local system of the terminal device. More specifically, the proxy program receives a request data packet via a listening port, and after marking the request data packet, the proxy program sends out the marked request data packet. The local system receives request data packets sent by the proxy program or an application program, and matches a mark in each request data packet. If matching is successful, the request data packet is forwarded directly to the acceleration server or the source site. If matching is not successful, the request data packet is re-directed to the listening port of the proxy program.

Further, while configuring the mark for the request data packet, the proxy program adds a mask to the mark.

Further, a value range of the mask is 0x8000000~0xfff00000.

Further, a version of the local system is Android 5.0 or above.

Further, the proxy program comprises an acceleration processing unit. Before the proxy program sends out the marked request data packet, the acceleration processing unit of the proxy program determines whether the request data packet needs to be accelerated. If the request data packet needs to be accelerated, a destination port and a destination IP address of the request data packet are changed to an acceleration server.

Further, a method of using the acceleration processing unit of the proxy program to determine whether the request data packet needs to perform acceleration comprises: first performing white list validation. The request data packet needs to be accelerated if the validation is successful, and if the validation is unsuccessful, whether the request data packet is a data packet of a HTTP request is determined. If the request data packet is the data packet of the HTTP request, whether acceleration is needed is determined based on a URL and a preset rule.

Further, a kernel of the local system is a Linux kernel.

Advantageous effects brought by technical solutions provided by embodiments of the present disclosure are as follows. In the data packet transmission method according to embodiments of the present disclosure, the proxy program receives a request data packet via a listening port, and after marking the request data packet, sends out the request data packet that carries the mark. The local system receives the request data packets sent by the proxy program and/or the application program, and matches the mark in each request data packet. If the matching is successful, the request data packet is forwarded directly, and if the matching is unsuccessful, the request data packet is re-directed to the listening port of the proxy program. By marking the data packet sent by the proxy program, the local system may distinguish the request data packets from the application program and the proxy program based on the mark and may further perform corresponding operations. Accordingly, endless loop of the data packet in the local system may be avoided.

BRIEF DESCRIPTION OF THE DRAWINGS

To more clearly illustrate technical solutions in embodiments of the present disclosure, the accompanying drawings used for describing the embodiments are briefly introduced hereinafter. Obviously, the accompanying drawings in the following descriptions are only some embodiments of the present disclosure, and for those ordinarily skilled in the relevant art, other drawings may be obtained based on the accompanying drawings without creative labor.

DETAILED DESCRIPTION

To make the objective, technical solutions and advantages of the present disclosure more apparent, implementation methods of the present disclosure will be described more fully hereinafter with reference to the accompanying drawings.

Embodiment 1

Figure 1:
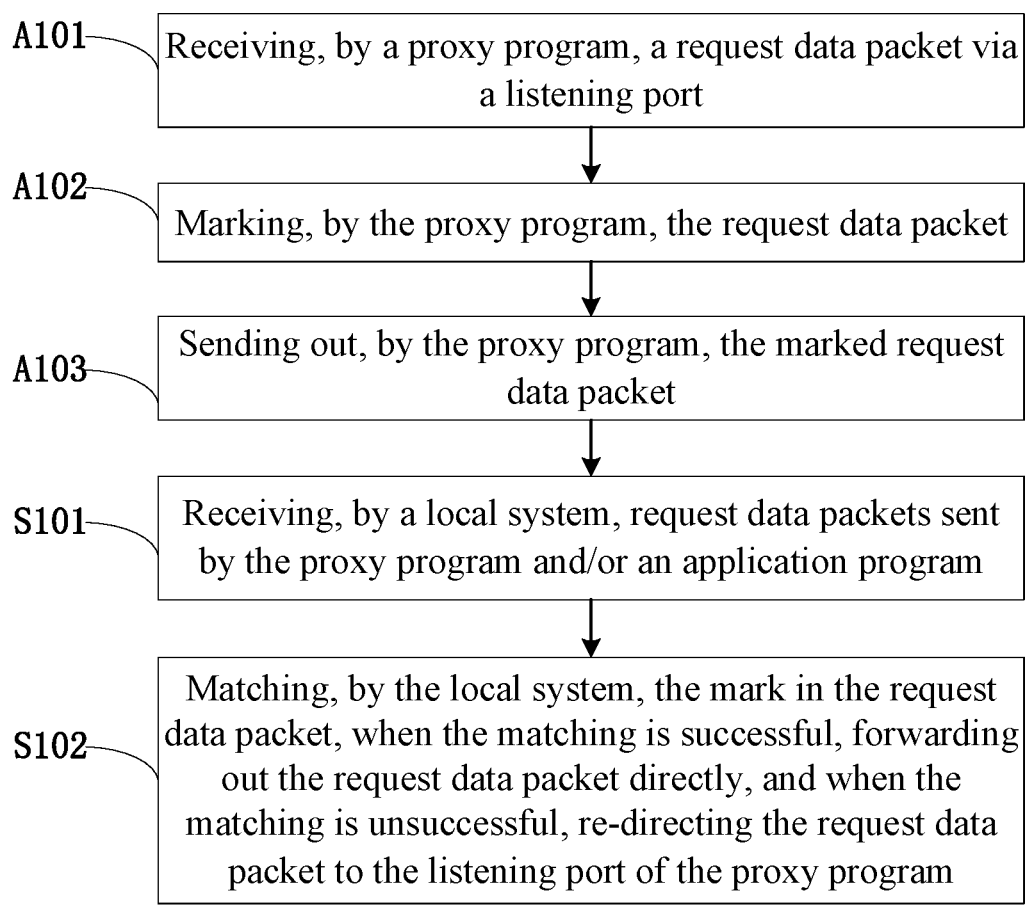
FIG. 1 illustrates a flow chart of a data packet transmission method according to Embodiment 1 of the present disclosure.

As shown in FIG. 1, Embodiment 1 of the present disclosure provides a data packet transmission method. The data packet transmission method involves a proxy program, an application program, and a local system. The application program is a program that provides a specific business service to a user, such as a browser, a music video service program, and other functional service programs, and the user obtains a corresponding service via operations on such application programs. The proxy program processes the request data packet sent by the application program, such that the request data packet sent by the application program that enjoys the network acceleration service may be forwarded to an acceleration server. The application program and the proxy program both run on the local system. In embodiments of the present disclosure, the kernel of the local system may be a Linux kernel, or an Android system. The present disclosure uses the Android system as an example.

The disclosed data packet transmission method comprises Steps A101~A103, and Steps S101~S102, and detailed descriptions are as follows:

In Step A101, the proxy program receives a request data packet via a listening port. As described previously, the proxy program needs to process the request data packet sent by the application program. Accordingly, when the proxy program is initiated, a specialized listening port is configured for receiving the request data packet sent by the application program. For example, the listening port of the proxy program may be configured to be 8123.

In Step A102: the proxy program configures a mark for the request data packet. More specifically, after receiving the request data packet, the proxy program establishes a proxy socket, and configures a mark for the socket by using the setsockopt( ) function in Linux. The mark may be, for example, mark=0x12345678.

In Step A103: the proxy program sends out the marked request data packet. The marked request data packet that is sent by the proxy program is received by the local system.

In Step S101, the local system receives request data packets sent by the proxy program and/or the application program. In one embodiment, the local system is an Android system, and a kernel of the Android system is a Linux kernel. As is known, Netfilter is a software framework inside the Linux kernel, and is configured to manage the network data packets. Further, iptables is an extensible user-space data packet managing tool realized based on the Netfilter basic framework. Most Linux systems own a module of iptables, and perform operations such as filtering, blocking, and re-directing on the network data packets via the module of iptables, thereby realizing functions such as the system firewall. In one embodiment, the request data packets sent by the proxy program and/or the application program are received via iptables.

In Step S102: a mark in a request data packet is matched. If the matching is successful, the request data packet is forwarded directly, and if the matching is unsuccessful, the request data packet is re-directed to the listening port of the proxy program. Similarly, the local system may perform matching on the mark in the data packet by configuring an iptables mark mark matching rule and a re-directing rule. If the matching is successful, the request data packet is forwarded directly based on the configured rule, and if the matching is unsuccessful, the request data packet is re-directed to the listening port of the proxy program. For example, the iptables mark mark matching rule and the re-directing rule may be configured as follows:

iptables -t nat -A OUTPUT -m mark --mark 0x12345678 -j RETURN; and iptables -t nat -A OUTPUT -p tcp -j REDIRECT --to-port 8123.

The role of the first rule is to process the data packet using a system default mode when the data packet includes a mark of mark=0x12345678, such that data packet is not re-directed, otherwise the second rule is executed. The role of the second rule is to re-direct the data packet to the listening port (e.g., the port 8123) of the proxy program.

As such, the request data packets sent by the proxy program may each includes a Mark mark. The local system may differentiate the application program and the proxy program via the Mark mark and carry out processing, respectively. Accordingly, the endless loop phenomenon described in the background section may be avoided.

It should be understood that, although in the accompanying drawing of the present disclosure, Step A103 and Step S101 shows a sequential order, in practical applications, because Step A 101~A103 are steps executed inside the proxy program, and Step S101~S102 are steps executed inside the local system, the sequential order between Step A103 and Step S101 is not fixed. That is, the accompanying drawings are only for illustrative purposes, and the present disclosure is not limited thereto.

Further, the disclosed data packet transmission method further includes steps as follows. The proxy program determines whether the data packet needs to be accelerated, and if the data packet needs to be accelerated, a destination port and a destination IP address of the request data packet are changed to an acceleration server. As such, when the local system receives the request data packet that needs to be accelerated, based on the re-directing rule, the request data packet may be forwarded to the acceleration server based on the destination port and the destination IP address of the request data packet. The acceleration server may provide a corresponding network acceleration service for the request data packet. Such step may be configured prior to Step A103.

More specifically, because a plurality of application programs may be installed in the local system and some of the application programs may not purchase the corresponding acceleration service, the proxy program needs to determine the application program that needs to be accelerated. The specific determination method may include: performing white list validation, and if the validation is successful, determining that the request data packet needs to be accelerated, where the white list stores the package name information of the application program that needs to be accelerated. Further, if the validation is unsuccessful, whether the request data packet is a data packet of a HTTP request is determined. If the request data packet is the data packet of the HTTP request, whether acceleration is needed is determined based on a URL and a preset rule.

As such, the classification of the application programs may be implemented, and processing may be only performed on the application program that needs to be accelerated.

Embodiment 2

Figure 2:
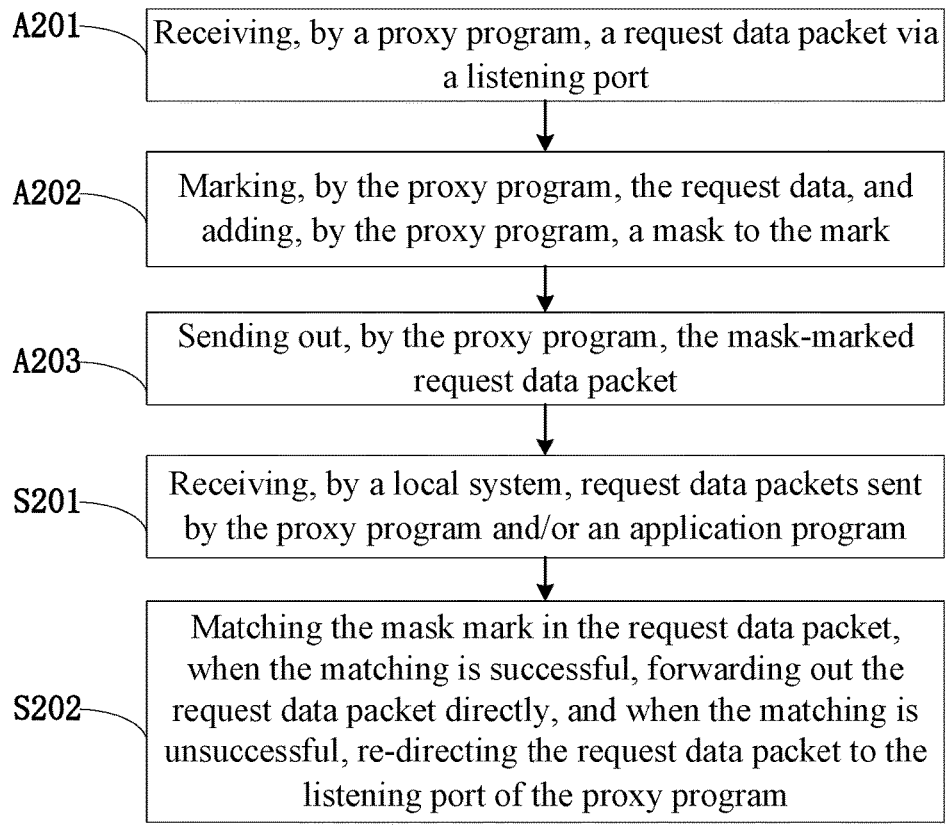
FIG. 2 illustrates a flow chart of a data packet transmission method according to Embodiment 2 of the present disclosure.

As shown in FIG. 2, Embodiment 2 of the present disclosure provides a data packet transmission method. The data packet transmission method involves a proxy program, an application program, and a local system. The application program is a program that provides a specific business service to a user, such as a browser, a music video program, and other functional service programs. The user obtains a corresponding service via operations on such application programs. The proxy program processes the request data packet sent by the application program, such that the request data packet sent by the application program that enjoys the network acceleration service may be forwarded to an acceleration server. The application program and the proxy program both run on the local system. In embodiments of the present disclosure, the kernel of the local system may be a Linux kernel, or an Android system. Embodiment 2 uses the Android system as an example.

The data packet transmission method in the present disclosure comprises Steps A201~A203, and Steps S201~S202. Detailed descriptions are as follows.

In Step A201, the proxy program receives a request data packet via a listening port. As described previously, the proxy program needs to process the request data packet sent by the application program. Accordingly, when the proxy program is initiated, a specialized listening port is configured to receive the request data packet sent by the application program. For example, the listening port of the proxy program may be configured to be 8123.

In Step A202: the proxy program configures a mark for the request data packet and adds a mask to the mark. More specifically, after receiving the request data packet, the proxy program establishes a proxy socket, and configures a mark for the socket by using the setsockopt( ) function in Linux. Further, the proxy program adds the mask to the mark, for example, the mask=0x12345678/0xfff00000.

In Step A203: the proxy program sends out the mask-marked request data packet. The mask-marked request data packet that is sent by the proxy program is received by the local system.

In Step S201, the local system receives request data packets sent by the proxy program and/or the application program. In one embodiment, the local system is an Android system, and a kernel of the Android system is a Linux kernel. As is known, Netfilter is a software framework inside the Linux kernel, and is configured to manage the network data packets. Further, iptables is an extensible user-space data packet managing tool implemented based on the Netfilter basic framework. Most Linux systems own a module of iptables, and perform operations such as filtering, blocking, and re-directing on the network data packet via the module of iptables, thereby realizing functions such as the system firewall. In one embodiment, the request data packets sent by the proxy program and/or the application program are received via iptables.

In Step S202: the mask mark in the request data packet is matched. If the matching is successful, the request data packet is forwarded directly, and if the matching is unsuccessful, the request data packet is re-directed to the listening port of the proxy program. Similarly, the local system may perform matching on the mask mark in the data packet by configuring an iptables mark mark matching rule and a re-directing rule. If the matching is successful, the request data packet is forwarded directly based on the configured rule, and if the matching is unsuccessful, the request data packet is re-directed to the listening port of the proxy program. For example, the iptables mark mark matching rule and the re-directing rule may be configured as follows:

iptables -t nat -A OUTPUT -m mark --mark 0x12345678/0xfff00000 -j RETURN; and iptables -t nat -A OUTPUT -p tcp -j REDIRECT --to-port 8123.

The function of the first rule is to process the data packet in a default mode of the system when the data packet includes a mask mark of mark=0x12345678/0xfff00000, such that data packet is not re-directed, otherwise the second rule is executed. The function of the second rule is to re-direct the data packet to the listening port (e.g., the port 8123) of the proxy program.

As such, the request data packets sent by the proxy program may each includes a Mark mark. The local system may differentiate the application program and the proxy program via the Mark mark, and subsequent processing may be performed, respectively. Accordingly, the endless loop phenomenon described in the background section may be avoided.

Further, because the marks in the request data packets all carry a mask, the issue that the mark cannot be correctly matched after being modified in the transmission process of the request data packet may be avoided. More specifically, in a system with a version of Android 5.0 or above, Netd in the system may tamper the mark in the data packet. If no mask is added in the mark, the matching may not be performed correctly. After careful studies, it is found that the tampering of the Netd on a 32 bits mark may only impact the lower 20 bits. Accordingly, in one embodiment, mask is added to the mark, and the matching rule is modified simultaneously. That is, the portion that is not tampered may be matched, thereby avoiding the issue that the mark cannot be matched correctly after being tampered. Correspondingly, in the system with the version of Android 5.0 and above, the value range of the mask is 0x8000000~0xfff00000. It should be understood that, in the system with other versions, if corresponding rules are satisfied, the processing procedure of the present disclosure may also be used, and the present disclosure is not limited thereto.

It should be understood that, though in the accompanying drawing of the present disclosure, Step A203 and Step S201 shows a sequential order. In practical applications, Step A 201~A203 are steps executed inside the proxy program, and Step S201~S202 are steps executed inside the local system. Thus, the sequential order of each step is not limited to the present disclosure. That is, the accompanying drawings are for illustrative purposes only, and the present disclosure is not limited thereto.

Further, the disclosed data packet transmission method further includes steps as follows. The proxy program determines whether the data packet needs to be accelerated, and if the data packet needs to be accelerated, a destination port and a destination IP address of the request data packet are changed to an acceleration server. As such, when the local system receives the request data packet that needs to be accelerated, based on the re-directing rule, the request data packet may be forwarded to the acceleration server based on the destination port and the destination IP address of the request data packet. The acceleration server may provide a corresponding network acceleration service for the request data packet. Such step may be configured prior to Step A203.

More specifically, because a plurality of application programs may be installed in the local system and some of the application programs may not purchase the corresponding acceleration service, the proxy program needs to determine the application program that needs to be accelerated. The specific determination method may include: performing white list validation, and if the validation is successful, determining that the request data packet needs to be accelerated, where the white list stores the package name information of the application program that needs to be accelerated. Further, if the validation is unsuccessful, whether the request data packet is a data packet of a HTTP request is determined. If the request data packet is the data packet of the HTTP request, whether acceleration is needed is determined based on a URL and a preset rule.

As such, the classification of the application programs may be implemented, and processing may be only performed on the application program that needs to be accelerated.

Embodiment 3

Figure 3:
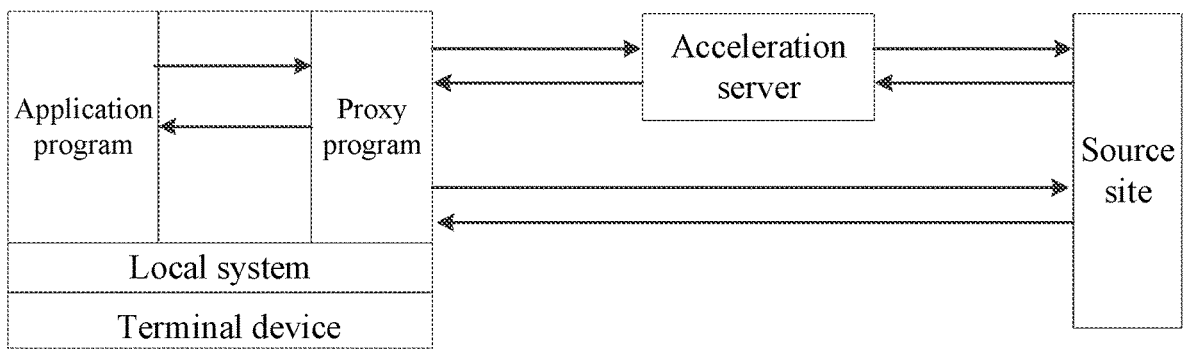
FIG. 3 illustrates a structural diagram of a data packet transmission system according to Embodiment 3 of the present disclosure.

As shown in FIG. 3, Embodiment 3 of the present disclosure provides a data packet transmission system. The data packet transmission system includes a terminal device, an acceleration server and a source site. An application program and a proxy program are run in the local system of the terminal device.

More specifically, the application program is a program that provides a specific business service to a user, such as a browser, a music video program, and other functional service programs. The user obtains a corresponding service via operations on such application programs. The application program receives a user operation, and sends out a corresponding request data packet. The request data packet may pass the proxy program and the local system before eventually arriving at the acceleration server or the source site for back-to-source purposes, thereby responding to a user request.

The proxy program processes the request data packet sent by the application program, such that the request data packet sent by the application program that enjoys the network acceleration service may be forwarded to an acceleration server. The proxy program receives the request data packet via the listening port, and after marking the request data packet, the proxy program sends out the request data packet that carries the mark.

More specifically, when the proxy program is initiated, a specialized listening port is configured to receive the request data packet sent by the application program. For example, the listening port of the proxy program may be configured to be 8123. After receiving the request data packet, the proxy program establishes a proxy socket, and configures a mark for the socket by using the setsockopt( ) function in Linux. Further, the proxy program adds a mask to the mark, for example, the mask=0x12345678. The marked request data packet is sent by the proxy program may be received by the local system.

It should be noted that, in some other embodiments of the present disclosure, the mark added by the proxy program to the request data packet may be a mark with mask (i.e., a mask mark), such as, mask=0x12345678/0xfff00000. Thus, not only the same function of the mark may be realized, but also, in systems with a certain version, the issue that correct matching cannot be performed due to the tampering of the mark may be prevented.

For example, in a system with a version of Android 5.0 or above, Netd in the system may tamper the mark in the data packet. If no mask is added in the mark, the matching may not be performed correctly. After careful studies, it is found that the tampering of the Netd on a 32 bits mark may only impact the lower 20 bits. Accordingly, in one embodiment, mask is added to the mark, and the matching rule is modified simultaneously. That is, the portion that is not tampered may be matched, thereby avoiding the issue that the mark cannot be matched correctly after being tampered. Correspondingly, in the system with the version of Android 5.0 and above, the value range of the mask is 0x8000000~0xfff00000. It should be understood that, in the system with other versions, if corresponding rules are satisfied, the processing procedure of the present disclosure may also be used, and the present disclosure is not limited thereto.

Before sending out the marked request data packet, the proxy program may further determine whether the data packet needs to be accelerated, and if the data packet needs to be accelerated, a destination port and a destination IP address of the request data packet are changed to an acceleration server. As such, when the local system receives the request data packet that needs to be accelerated, based on the re-directing rule, the request data packet may be forwarded to the acceleration server based on the destination port and the destination IP address of the request data packet. The acceleration server may provide a corresponding network acceleration service for the request data packet. Further, the request data packet that does not need acceleration may be forwarded to the source site by the local system based on the original terminal and the IP address.

More specifically, because a plurality of application programs may be installed in the local system and some of the application programs may not purchase the corresponding acceleration service, the proxy program needs to determine the application program that needs to be accelerated. The specific determination method may include: performing white list validation, and if the validation is successful, determining that the request data packet needs to be accelerated, where the white list stores the package name information of the application program that needs to be accelerated. Further, if the validation is unsuccessful, whether the request data packet is a data packet of a HTTP request is determined. If the request data packet is the data packet of the HTTP request, whether acceleration is needed is determined based on a URL and a preset rule.

As such, the classification of the application programs may be implemented, and processing may be carried out only for the application program that needs to be accelerated.

The local system receives the request data packets sent by the application program and the proxy program, and matches a mark in each request data packet. When matching is successful, the request data packet is forwarded directly to the acceleration server or the source site, and if matching is unsuccessful, the request data packet is re-directed to the listening port of the proxy program.

In one embodiment, the local system is an Android system, and a kernel of the Android system is a Linux kernel. As is known, Netfilter is a software framework inside the Linux kernel, and is configured to manage the network data packets. Further, iptables is an extensible user-space data packet managing tool implemented based on the Netfilter basic framework. Most Linux systems own a module of iptables, and perform operations such as filtering, blocking, and re-directing on the network data packet via the module of iptables, thereby realizing functions such as the system firewall. In one embodiment, the request data packets sent by the proxy program and the application program are received via iptables.

Similarly, the local system performs matching on the mark in the data packet by configuring the iptables mark matching rule and the re-directing rule. If the matching is successful, the request data packet is forwarded directly based on the configured rules, and if the matching is unsuccessful, the request data packet is re-directed to the listening port of the proxy program. It may be understood that, in one embodiment, the mark configured by the local system when configuring the iptables mark matching rule may be the same as the mark configured by the proxy program for the request data packet. Using the mask mark as an example, the iptables mark matching rule and the re-directing rule may be configured as follows:

iptables -t nat -A OUTPUT -m mark -mark 0x12345678/oxfff00000 -j RETURN; and iptables -t nat -A OUTPUT -p tcp -j REDIRECT -to-port 8123.

The function of the first rule is to process the data packet in a default mode of the system when the data packet includes a mask mark of mark=0x12345678/oxfff00000, such that data packet is not re-directed, otherwise the second rule is executed. The function of the second rule is to re-direct the data packet to the listening port (e.g., the port 8123) of the proxy program.

As such, the request data packets sent by the proxy program may each includes a Mark mark. The local system may differentiate the application program and the proxy program via the Mark mark and processing may be carried out, respectively. Accordingly, the endless loop phenomenon described in the background section may be avoided.

Further, because the marks in the request data packet all carry a mask, the issue that the mark cannot be correctly matched after being modified in the transmission process of the request data packet may be avoided. More specifically, in a system with a version of Android 5.0 or above, Netd in the system may tamper the mark in the data packet. If no mask is added in the mark, the matching may not be performed correctly. After careful studies, it is found that the tampering of the Netd on a 32 bits mark may only impact the lower 20 bits. Accordingly, in one embodiment, mask is added to the mark, and the matching rule is modified simultaneously. That is, the portion that is not tampered may be matched, thereby avoiding the issue that the mark cannot be matched correctly after being tampered. Correspondingly, in the system with the version of Android 5.0 and above, the value range of the mask is 0x8000000~0xfff00000. It should be understood that, in the system with other versions, if corresponding rules are satisfied, the processing procedure of the present disclosure may also be used, and the present disclosure is not limited thereto.

The sequence of the aforementioned embodiments is for illustrative purpose only, and may not represent the preference of each embodiment.

The device embodiments described above are for illustrative purposes only, and the units illustrated as separate parts may be or may not be physically separated. The parts illustrated as units may be or may not be physical units. That is, the parts may be located in a same place, or distributed to a plurality of network units. A part of or all modules thereof may be selected to realize the object of solutions of the present disclosure based on the actual demand. Those ordinarily skilled in the relevant art may understand and implement the present disclosure without contributing creative labor.

Via the descriptions of the aforementioned embodiments, those skilled in the relevant art may clearly understand that each embodiment may be implemented using software and an essential universal hardware platform, or via the hardware. Based on such understanding, the nature of the aforementioned technical solutions or the part of the aforementioned technical solutions that contributes to the existing technique may be embodied in a form of software products. Such computer software product may be stored in a computer readable storage medium, such as ROM/RAM, magnetic disc, and optical disc, etc., that comprises a plurality of commands configured to allow a computing device (e.g., a personal computer, a server, or a network device, etc.) to execute each embodiment or methods described in some parts of the embodiments.

The aforementioned is only preferred embodiments of the present disclosure and is not configured to limit the present disclosure. Any modification, equivalent replacement, and improvement, etc. without departing from the spirit and principles of the present disclosure, shall all fall within the protection range of the present disclosure.

What is claimed is:

1. A data packet transmission method, comprising:
   receiving, by a proxy program, a request data packet via a listening port of the proxy program, marking the request data packet, adding a mask to the mark of the request data packet, and after adding the mask to the mark of the request data packet, sending out, by the proxy program, the request data packet; and
   receiving, by a local system, a plurality of request data packets sent by the proxy program or an application program, and matching, by the local system, a mark in each request data packet sent by the proxy program or an application program, wherein when the matching is successful, the request data packet sent by the proxy program or the application program is forwarded out directly, and when the matching is unsuccessful, the request data packet sent by the proxy program or the application program is re-directed to the listening port of the proxy program, wherein before the sending out, by the proxy program, the marked request data packet, the method further includes:

determining, by the proxy program, whether the request data packet needs to be accelerated, and when the request data packet needs to be accelerated, changing a destination port and a destination IP address of the marked request data packet to an acceleration server, which provides a corresponding network acceleration service for the marked request data packet.

2. The data packet transmission method according to claim 1, wherein a value range of the mask is 0x8000000 to 0xfff00000.

3. The data packet transmission method according to claim 1, wherein a version of the local system is Android 5.0 or above.

4. The data packet transmission method according to claim 1, wherein determining whether the request data packet needs to be accelerated comprises: performing a white list validation, wherein:

when the validation is successful, the request data packet needs to be accelerated, and when the validation is unsuccessful, whether the request data packet is a data packet of a HTTP request is determined, and when the request data packet is determined to be the data packet of the HTTP request, whether acceleration is needed is determined based on a URL and a preset rule.

5. The data packet transmission method according to claim 1, wherein the proxy program and the application program run on the local system.

6. The data packet transmission method according to claim 1, wherein a kernel of the local system is a Linux kernel.

7. A data packet transmission system, comprising a terminal device, an acceleration server, and a source site, wherein:

an application program and a proxy program are configured to run on a local system of the terminal device;

the proxy program is configured to receive a data request data packet via a listening port, mark the request data packet, add a mask to the mark of the request data packet, and after adding the mask to the mark of the request data packet, send out the marked request data packet; and the local system is configured to receive a plurality of request data packets sent by the application program or the proxy program and perform matching on a mark in each request data packet sent by the proxy program or the application program, wherein when the matching is successful, the request data packet sent by the proxy program or the application program is forwarded directly to the acceleration server or the source site, and when the matching is unsuccessful, the request data packet sent by the proxy program or the application program is re-directed to the listening port of the proxy program, wherein the proxy program includes an acceleration processing unit, and before the proxy program sends out the marked request data packet, the acceleration processing unit of the proxy program is configured to determine whether the request data packet needs to be accelerated, and when the request data packet needs to be accelerated, modify a destination port and a destination IP address of the request data packet to the acceleration server, which provides a corresponding network acceleration service for the marked request data packet.

8. The data packet transmission system according to claim 7, wherein a value range of the mask is 0x8000000 to 0xfff00000.

9. The data packet transmission system according to claim 7, wherein a version of the local system is Android 5.0 or above.

10. The data packet transmission system according to claim 7, wherein the acceleration processing unit of the proxy program is configured to determine whether the request data packet needs to be accelerated by: performing white list validation, wherein:

when the validation is successful, the request data packet needs to be accelerated, and when the validation is unsuccessful, whether the request data packet is a data packet of a HTTP request is determined, and when the request data packet is determined to be the data packet of the HTTP request, whether acceleration is needed is determined based on a URL and a preset rule.

11. The data packet transmission system according to claim 7, wherein a kernel of the local system is a Linux kernel.

* * * * *